Sept. 16, 1969     W. A. AYRES     3,467,098

FLEXIBLE CONDUIT FOR LASER SURGERY

Filed March 24, 1967     2 Sheets-Sheet 1

INVENTOR
WALDEMAR A. AYRES
BY
ATTORNEYS

Sept. 16, 1969 W. A. AYRES 3,467,098
FLEXIBLE CONDUIT FOR LASER SURGERY
Filed March 24, 1967 2 Sheets-Sheet 2
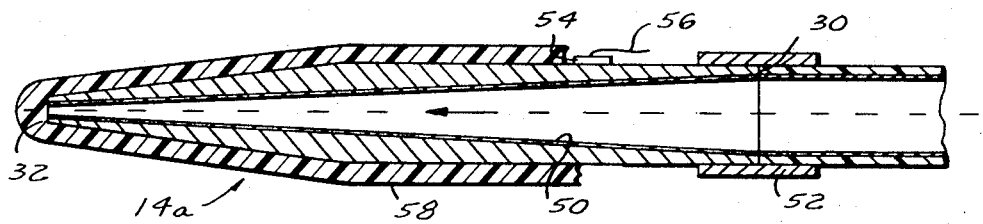
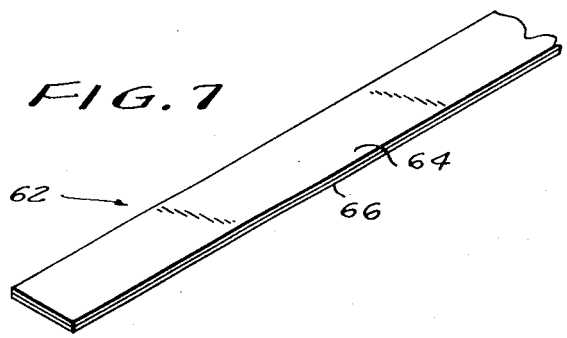
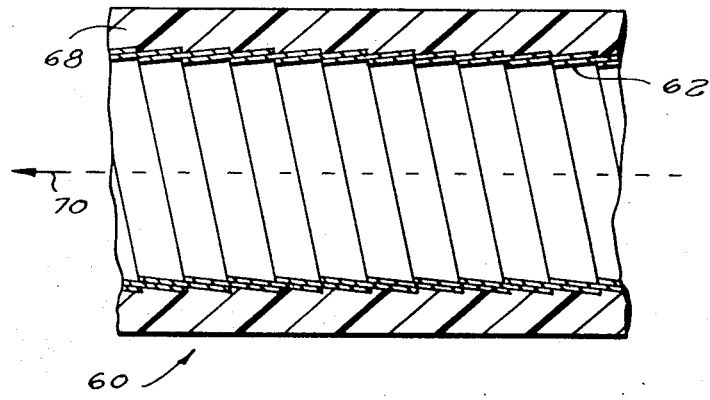
INVENTOR
WALDEMAR A. AYRES
BY
ATTORNEYS United States Patent Office 3,467,098
Patented Sept. 16, 1969

3,467,098
FLEXIBLE CONDUIT FOR LASER SURGERY
Waldemar A. Ayres, Rutherford, N.J., assignor to Becton, Dickinson and Company, Rutherford, N.J., a corporation of New Jersey
Filed Mar. 24, 1967, Ser. No. 625,772
Int. Cl. A61b *17/36, 17/32;* A61n *3/00*
U.S. Cl. 128—303.1       10 Claims

ABSTRACT OF THE DISCLOSURE

A closed system for conducting laser light energy from a source to a hand manipulable instrument for focusing the light at a point remote from the instrument distal end for use in surgery. A flexible elongated cylindrical member allowing the hand manipulable instrument to be readily moved to any point in space within three mutually perpendicular planes having an inner reflective surface coating to reflectively conduct the light energy toward the point of focus.

Background of the invention

Following the development of the laser, among other uses the application of beams developed by various sources of laser energy has been directed to surgery and the treatment of cancer. This application of a laser beam has now acquired widespread attention within the medical field as well as other fields in which laser devices may suitably be used.

While the use of laser concentrated beams in surgery is known, a major problem has existed in providing a method and apparatus whereby a beam from a laser generator, generally fixedly located, may be conducted to an instrument capable of being grasped and freely moved by the hand to any position in space and particularly to a body part of a patient. This movement of the instrument should be carried out almost as readily as the hand could move a surgeon's scalpel to any position in space and with the same freedom of attitude of the scalpel.

Attempts have been made to overcome this problem. One such attempt has been the implementation of double gimbal mirrors to deflect a laser beam either to a desired location or along a predetermined path. Without extensive training the attempts have not met with much success since this particular manipulation of mirrors to move a beam is an unnatural activity and therefore one of great difficulty. A prime cause of this difficulty may be that for any angular deflection of the reflecting surface the beam undergoes a deflection twice as great. Therefore, it becomes necessary to coordinate the angular movement of the reflective surface with the movement that the beam is desired to undertake.

Summary of the invention

Thus, the present invention is broadly directed to an elongated conduit connecting a laser generator to a hand manipulable instrument thereby to conduct a laser beam from the former to the latter through a closed system. The conduit is flexible throughout its length and has its internal surface smoothly coated with a thin layer of medium capable of reflecting with minimal energy loss and conducting the laser beam to the instrument. The instrument carries optical means for focusing the laser beam at a predetermined axial location in front of the distal end whereby the laser beam, due to the flexible nature of the conduit and freedom of instrument movement within three mutually perpendicular planes, is used in surgical procedures.

In view of the foregoing, the invention uniquely overcomes the problems and disadvantages discussed and has for a principal object the provision of light, flexible and easily manipulated conduit system connecting a stationary laser source to a hand grasped instrument, whereby a laser beam is conducted through a closed path to the hand grasped instrument for focusing and directing the beam to a body area within which surgery is being performed.

Other objects and advantages of the invention will readily come to mind during the course of the following discussion, read in conjunction with the several figures.

Brief description of the drawings

FIGURE 6 is a view similar to FIG. 5 yet showing a second form of instrument;

FIGURE 7 is a perspective view of a ribbon of material with a metallic coating; and FIGURE 8 is a side elevational view in section of the coated ribbon of FIG. 7 helically wound and externally coated as in FIG. 1.

Description of the invention

Figure 4:
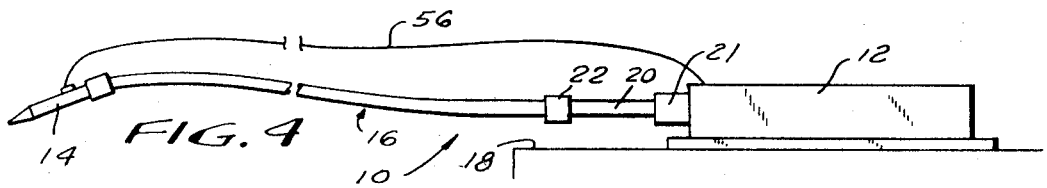
FIGURE 4 is an elevational view of the assembly including a laser generator, a flexible conduit and a hand manipulable instrument located remotely of the generator.

The assembly 10, FIG. 4, includes a laser generator 12, a hand manipulable instrument or stylus 14 and means in the form of a closed conduit 16. As shown, the conduit interconnects the generator and stylus thereby to conduct efficiently the generator output or laser light beam from the former to the latter.

The laser generator may be any one of many types of generators now known to the art. No particular laser generator of this large group is contemplated since the present invention is equally well suited for one type as another. Obviously, the use and its parameters will have an effect on the choice of generator. Therefore, for the sake of further discussion it may be assumed that the generator 12 which is discussed herein and which may be employed in the preferred embodiment is the laser generator commonly referred to as a carbon dioxide ($CO_2$) laser generator. This generator operates with a light wavelength of 10.60 microns. This specific recitation of one laser and, below, of a specific reflecting medium is not to be considered as a limiting factor for clearly many structures may be used, equally as well. Therefore, this specific recitation is only for the purpose of attaining a greater understanding of the invention.

Since the present invention is not specifically directed to a laser generator per se, but, rather its use in conjunction with a conduit system, it is not considered necessary to go into a detailed discussion of the operation of a typical generator. If desired, reference on such typical operation may be acquired from any one of a multitude of technical books or journals.

In FIG. 4, the generator 12 is supported on a surface 18 which, as shown, represents a table or the equivalent. It should be understood, however, that the generator may be fixedly supported on a ceiling or any other suitable surface, as choice dictates. A ceiling mounting may be desirable since, in this manner, the generator will be located remotely of the operating table and away from the congested area.

A conduit 20, in the from of a rigid cylindrical member, is provided at the output of the laser generator. The conduit 20 is generally supplied as part of the laser and projects from a neck 21 on the laser housing. The distal end of conduit 20 is provided with any suitable and well-known coupling sleeve 22 to connect the closed elongated conduit 16 to the generator. Thus, the developed laser light energy is reflectively conducted to the stylus.

While not shown in the figures the conduit 20 may be provided with a tapered internal surface. The slope of taper is generally constant and the conduit, at the end remote from the generator, is provided with an internal diameter which is substantially equal to the internal diameter of the conduit. Therefore, the collimated laser energy emanating from the laser generator, if of a diameter larger than the flexible conduit diameter, will tend to be funnelled into the conduit 16. In a manner and for the purpose to be described the internal surface of conduit 20 may be coated so that, with very high efficiency, it reflects the laser beam emanating from the laser generator output. As is well known in the art there are surfaces which, for particular certain laser wavelengths, reflect the beam with practically no energy losses.

It should also be kept in mind that the conduit 20 may have constant internal diameter with only the distal end being tapered thereby to funnel the light into the conduit. With this structure at least the tapered portion should be coated. Preferably, though, the generator will provide a collimated and coherent beam output of a desired reduced cross-sectional diameter approximating the conduit 16 internal diameter, thereby to obviate the necessity to have an internally tapered and coated connection, as discussed.

Figure 1:
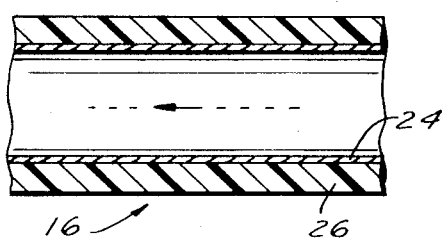
FIGURE 1 is a side elevational view in section of one form of flexible conduit for conduction of laser light energy.

Conduit 16, referring to FIG. 1, includes a layer of reflective material 24 and an outer coating layer 26. As discussed above, the present invention may use the carbon dioxide laser which characteristically has a light wavelength of 10.60 microns. For this wavelength the preferable reflective material for good efficiency is considered to be gold. As may be expected, for maximum efficiency, the reflective material to be used is dependent upon the generator wavelength although a particular surface, with some loss in efficiency, may be used with lasers having different yet relatively close wavelength characteristics. Obviously, the material efficiency decreases the further the wavelength moves from the prescribed wavelength.

As will be discussed below the reflective layer 24 may be formed by various well-known techniques. By similar well-known techniques, such as dipping or casting, the outer layer 26, of a natural or synethetic material, may be coated on the reflective surface 24 thereby to support the same. Preferably the outer layer is flexible to allow the desired movement of stylus 14.

Suitable natural or synthetic materials of a flexible nature so as to be adaptable for use as a coating include, for example, rubber, both natural and synthetic, ABS resins and GR–S resins. Several important considerations in choosing the particular material is its usage with acceptable dipping or casting processes and that it should have good adhesion characteristics so as to firmly adhere to the reflective layer 24.

Figure 2:
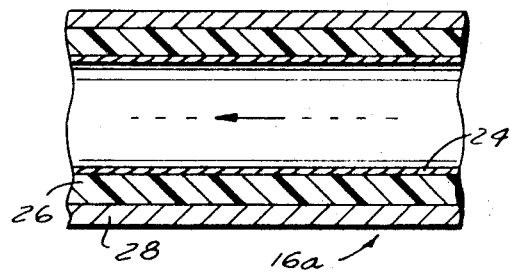
FIGURE 2 is a view similar to FIG. 1 yet showing a second form of flexible conduit.

A second embodiment of conduit is shown in FIG. 2. This figure shows a conduit, generally indicated as 16a. The conduit is similar to conduit 16 except that it includes, exteriorly of the flexible coating layer 26, a second coating layer 28.

Coating layer 28 has the primary function to limit the amount of flexure the conduit may undergo by specifically defining some minimal bending limit or the radius of curvature of conduit 16a. Layer 28 may be of any suitable as, for example, a layer of fibrous material or even metal, such as B–X cable. Irrespective of the nature of the outer surface 28 it is to characteristically have limited outside elongation capability.

All of the foregoing materials adapted for use as an outer layer 28 negate or substantially reduce the capability of the conduit to undergo sharp bending with the material providing some minimal radius of curvature beyond which the conduit may not flex. In this manner the tendency of the reflective layer 24 to rupture or wrinkle is reduced since its outer and inner surface will go into tension and compression, respectively, as the conduit is flexed. The reflective medium layer, for example, gold, should be sufficiently thin and ductile so that with a minimum radius of curvature as, for example, 10–12 inches, only a very small dimensional variance be present between the inside and outside portions of reflective layer. As will be discussed the layer is sufficiently thin that the dimensional difference is within the ductile limit of the material.

Figure 5:
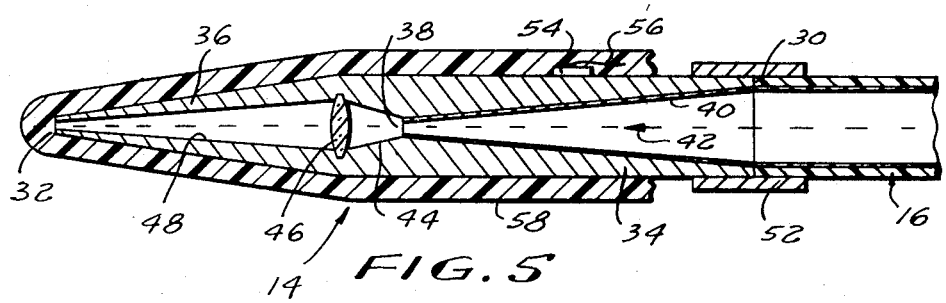
FIGURE 5 is a side elevational view in section of one form of hand manipulable instrument.

Stylus member 14 may be seen in FIG. 5. The stylus is in the form of an elongated pencil shaped instrument generally similar to a surgeon's scalpel. The stylus has a central opening extending from one end 30 to the other end 32 and may be formed of metal or any other sturdy and rigid material. Preferably the outside surface of the stylus is cylindrical in the region 34 to be gripped and frusto-conically tapered in the region 36 at the distal end. The angle of taper of the outer surface may be a function of the lens. In other words, following an imaginary line from end 32 along the taper the operator or surgeon can easily determine the focal point and maximum power point of the laser beam before the laser is turned on. This is an important consideration particularly when working with laser sources that develop a beam which cannot be seen (infra-red or ultra-violet) or cannot readily be seen by the human eye. Thus, the surgeon may position his hand and stylus for the result desired while the laser unit is inoperative.

The internal portion of the stylus, within the portion 34, is smoothly tapered from the end 30 toward an aperture 38 of reduced diameter. The tapered wall is indicated at 40 and is provided with a reflective coating. As discussed with regard to conduit 20, the laser light will effectively be funnelled toward aperture 38, in the direction of arrow 42. Past the aperture the central opening is tapered outwardly, as indicated at 44. A lens 46 is secured downstream of aperture 38 by any convenient mounting structure.

The lens 46 is positioned on the longitudinal axis of the stylus 14. It functions in a manner to collect the laser light that has been reflectively conducted from the generator through the conduit and focus the light in a small-area high-intensity spot forward of end 32. In the discussed embodiment, the lens is contemplated as being of an infra-red variety.

Under optimum operating conditions the internal shape of the stylus central opening, between lens 46 and end 32, will be of no concern. For convenience the central opening is defined by a wall 48 which gradually tapers toward a small annular end opening at 32. As stated, the laser beam is concentrated and focused thereby to travel along the axis of stylus 14.

FIG. 6 shows a second stylus embodiment 14a. This stylus is substantially similar to stylus 14. Thus, the stylus 14a is generally cylindrical within the portion that is grasped and frustoconically tapered at the distal end to form an annular surface defining an opening of reduced diameter.

The stylus 14a is likewise formed of metal or otherwise of a sturdy material and is internally provided, along its axis, with a smooth internal wall 50 of constant taper and coated with a reflective medium from end 30 to end 32. As discussed in relation to conduit 20 the internal taper tends to funnel the laser energy toward the opening at 32, and in this manner concentrate the rays.

Referring to both FIGS. 5 and 6, the stylus units are shown connected by coupling sleeves 52, or other suitable structure, to the flexible conduit 16. The stylus units are also provided with a switch 54 which may be of the pressure type for on-off control of laser generator 12. This may prove to be an important convenience to have the on-off control at the surgeon's fingertips, particularly if the laser generator is positioned at a removed location, such as on a ceiling. Thus, the laser generator may be controlled as the stylus is held and moved within the working area. A pair of conductors 56 (FIG. 1) electrically connect the stylus 14 and laser generator 12.

The stylus 14 and, for that matter, the entire laser conducting assembly is formed to completely enclose the laser beam throughout its passage from the source to the stylus. That the system for conducting the beam is a closed system is of utmost importance since the hazard to sight, in an open system, is great and maximum protection must be afforded to the eyes. Thus, stray laser light must not be allowed.

The stylus units 14 and 14a are provided with an antiseptic plastic covering 58. Such a covering may be of any desired shape or form, etc., and may slip-fit over the unit. Generally, however, the covering 58 is in the form of a thin plastic film which is shown to be greatly out of proportion, for the sake of clarity, in FIGS. 5 and 6. Therefore, the necessity of sterilizing the stylus which, in all likelihood, will have been very close to the patient's open wound is obviated. Thus, the sterility provided by the covering 58 will comply with hospital regulations requiring that all apparatus and equipment which is movable to a position above the operating table be in a sterile condition.

Conduits 16 and 60 (FIGS. 1 and 8) are formed in differing manners. With regard to conduit 60 reference is directed to FIG. 7 which represents an elongated ribbon 62 having a deposited metallic layer 64 and a base layer 66. The base 66 may be formed of any suitable material. For example it may be a metallic material, such as stainless steel. Layer 64, as will be discussed below, is deposited by conventional methods to adhere to the base, forming the ribbon which may be of a thickness in the range of 2 or 3 thousandths of an inch. This dimension is not recited to limit the invention but rather for descriptive purposes. Clearly the ribbon may be of any thickness that may helically wound as will be described. In this embodiment the deposited material is gold having a thickness in excess of one molecular layer, which is the minimal thickness permissible for high efficiency conduction of the laser light. More specifically and with a ribbon thickness, as discussed, the thickness of the deposited layer may be about $3 \times 10^{-6}$ inches. By use of gold a high efficiency may be considered to be 99+%.

In FIG. 8, the ribbon 62 is wound in a manner such that it overlaps in the direction of laser light travel as indicated by arrow 70. In this manner there will be no ribbon edge presented and therefore no unnecessary reflection of the beam during travel. A flexible coating 68 as discussed above surrounds the helically wound ribbon to provide necessary support.

While not shown, the conduit 60 internal diameter may gradually taper from one end to the other. To taper the internal diameter or not is a matter of choice.

Figure 3:
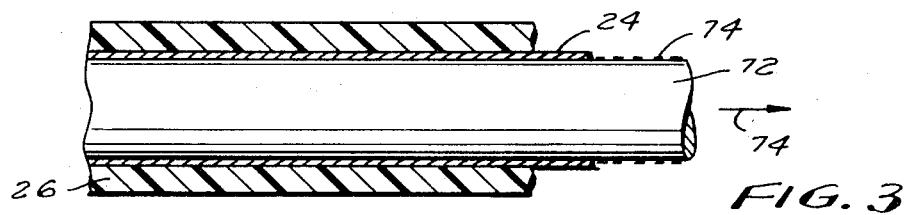
FIGURE 3 is a side elevational view in section of the conduit of FIG. 1 being supported, during formation, by a forming mandrel.

The conduit 16 is formed in a manner as generally represented by FIG. 3. Thus, a mandrel 72, having a highly polished and smooth surface is provided with a layer 74 which may be silicone or another appropriate parting agent prior to the metal coating step.

The mandrel or core may be formed of a metallic material, such as steel or a low melting point alloy, a wax substance or an acid dissolvable material to name a few. In any case the mandrel or core is removed once a metal deposition and supporting tube 26 is provided. Thus, the mandrel may be extracted by removing it, melting it, or by dissolving it with acid.

The mandrel or core 72 may have a uniform outer diameter or tapered, also as choice dictates. Normally, it will be relatively small in diameter, as for example ⅛ inch.

The metallic reflecting surface may be provided by any one of many commercially feasible plating procedures, such as vacuum deposition or metalizing and electroplating. Other procedures may be equally adaptable for this purpose and, since these procedures are extremely well-known further discussion is deemed unnecessary.

By means of the parting agent coating the deposited reflecting metal surface will not or only poorly adhere to the mandrel or core and without great difficulty the latter may be removed. Obviously this step is not carried out until a natural or synthetic material is, by conventional casting or dipping processes, provided as in FIG. 3. Thereafter, the mandrel may be extracted as indicated by arrow 74, and the coating 26, by sufficient adhesion, acts to support the relatively thin reflective layer 24.

The coating layer 26, additionally provides an insulation coating around the reflective layer 24. Therefore, layer 26 may desirably be a poor conductor of heat-developed internally of the conduit by the laser light energy being reflectively conducted the length of the conduit.

From the foregoing the objects are carried out and the advantages of the present invention should be apparent to those skilled in the art. While the foregoing discussion has generally been directed to a preferred embodiment this discussion has been for the purpose of illustration and is not meant to be limiting in any sense for clearly many modifications will now be apparent yet be within the scope of the invention whose limits are defined by the appended claims.

What is claimed is:

1. A system capable of conducting efficiently a laser beam emanating from a laser generator through the spatial distance from the source to a patient whereby the laser beam may be used in surgical applications, said system comprising an instrument having a longitudinal axis adapted to be held in the hand thereby to direct a laser beam relative to the patient, means within said instrument for concentrating the laser beam near the instrument end, and means connecting the instrument to said laser source so that the instrument is relatively freely movable to any desired point within three mutually perpendicular planes, said connecting means including an elongated flexible conduit member having a longitudinal axis and a central bore, and reflective surface means, said means being in the form of a continuous film of reflective material adhered to said bore wall so that said laser beam is reflectively conducted to said instrument.

2. The system of claim 1 wherein said means for concentrating said laser beam includes an optical system.

3. The system of claim 2 wherein said optical system is mounted transverse to said axis between the instrument ends.

4. The system of claim 1 also comprising a control means, said control means being carried by said instrument whereby operation of said laser generator may be remotely controlled.

5. The system of claim 1 also comprising a disposable shield, said shield being removably applied to said instrument so that said instrument is maintained in a condition of sterility.

6. The system of claim 1 wherein said instrument distal end is tapered on opposed instrument sides to converge substantially at the focal point.

7. The system of claim 1 wherein a substantial length of the instrument bore upstream of said concentrating means is provided with a continuous film of reflective material.

8. A conduit element for use in a laser beam conduit system adapted to be used in surgical procedures comprising a tubular flexible member and a continuous smooth surface layer of a laser reflective material adhered to the inner circumference of said member.

9. The conduit element of claim 8 additionally including a tubular casing surrounding said flexible member, said casing adapted to limit the minimum radius of curvature of said laser reflective material.

10. In a laser beam conduit system for surgical use, a laser beam generator, flexible elongated conduit means adapted to conduct the laser beam to any location in a predetermined three dimensional work space relative to a patient, and laser stylus means having freedom of attitude in three mutually perpendicular planes to facilitate manipulation, said stylus means being connected to said generator by said conduit means.

References Cited
UNITED STATES PATENTS

| | | | |
|---|---|---|---|
| 2,424,064 | 7/1947 | Stegeman | 128—6 XR |
| 3,315,680 | 4/1967 | Silbertrust et al. | 128—395 |

L. W. TRAPP, Primary Examiner

U.S. Cl. X.R.
128—305, 395